United States Patent
Dong et al.

(10) Patent No.: US 8,370,666 B2
(45) Date of Patent: Feb. 5, 2013

(54) ELECTRICAL INSTRUMENT HAVING A PROTECTION CIRCUIT

(75) Inventors: Wei Dong, Nanjing (CN); Wu Chen, Nanjing (CN); Huanrong Song, Nanjing (CN); Chuanyang Lu, Nanjing (CN)

(73) Assignee: Chervon Limited, Wanchai (HK)

( * ) Notice: Subject to any disclaimer, the term of this patent is extended or adjusted under 35 U.S.C. 154(b) by 266 days.

(21) Appl. No.: 12/861,883

(22) Filed: Aug. 24, 2010

(65) Prior Publication Data

US 2011/0050299 A1   Mar. 3, 2011

(30) Foreign Application Priority Data

Aug. 31, 2009   (CN) ...................... 2009 2 0048118 U

(51) Int. Cl.
   *G06F 1/32* (2006.01)
(52) U.S. Cl. ........................................ 713/323; 713/324
(58) Field of Classification Search ........... 713/323–324
   See application file for complete search history.

(56) References Cited

U.S. PATENT DOCUMENTS

| 4,475,150 A | | 10/1984 | D'Atre et al. | |
|---|---|---|---|---|
| 5,758,175 A | * | 5/1998 | Fung | 713/323 |
| 6,119,186 A | * | 9/2000 | Watts et al. | 710/104 |

OTHER PUBLICATIONS

Canadian Intellectual Property Office, Office Action dated Oct. 22, 2012 issued on Canadian patent application No. 2,713,624, 2 pages.

\* cited by examiner

*Primary Examiner* — Dharti Patel
(74) *Attorney, Agent, or Firm* — Greenberg Traurig, LLP

(57) ABSTRACT

A protection circuit suitable for electrical instruments includes a software detecting circuit, a logic AND circuit, a driver and control circuit for engine operating power components, and a hardware detecting circuit connected with the logic AND circuit. Both the software detecting circuit and the hardware detecting circuit monitor the state of an operating switch and provide signals to the logic AND circuit. Only when the state of the switch changes from opened to closed and both detecting circuits determine that this state is correct will the driver and control circuit signal the engine to operate. Furthermore, by connecting two or more power components in serial at the same time, the engine will not work by accident and the machine will not be out of control when any one of the power components is damaged. A circuit using capacitors of suitable specification can also be provided to isolate the controlling pin of a power component in the form of an SCR to thereby avoid failure and damage of the entire system.

8 Claims, 4 Drawing Sheets

ELECTRICAL INSTRUMENT HAVING A PROTECTION CIRCUIT

RELATED APPLICATION

This application claims the benefit of CN 200920048118.6, filed on Aug. 31, 2009, the disclosure of which is incorporated herein by reference in its entirety.

BACKGROUND

When an electrical instrument is powered-up, if an operating switch is in an open state an engine of the electrical instrument will be inoperable and, if the operating switch is in a closed state, the engine will operate as soon as the electrical instrument is powered-up, which thus induces safety concerns.

According to new safety criterion, when the operating switch is in the closed state, the engine must not start operating when the electrical instrument is initially powered-up. To this end, many systems for controlling engine operation are composed of a microcontroller and accessory circuits. Although the microcontroller system does provide some protection, the microcontroller system is easy interfered with by the environment and can therefore suffer instability on power-up of the electrical instrument and cause safety issues. In this regard, the current through the power components in the control circuit and the voltage applied thereto are typically very high and the power components can therefore be easy damaged by such current and voltage. Similarly, many products using AC power use Silicon Controlled Rectifiers (SCRs) in serial in a main loop to control the circuit on/off, adjust speed, adjust voltage, etc., and electromagnetic interference can damage some elements in the main loop. When the elements in the control circuit are damaged, the engine may get out of control which exposes the user to further dangers. The new safety criterion therefore requires that if any element in the control circuit is damaged, the engine must not operate.

SUMMARY

Described hereinafter is a protection circuit suitable for electrical instruments which comprises a hardware detecting circuit, a software detecting circuit, a driver and control circuit for power components, a logic AND circuit, and a plurality of power components, wherein the outputs of both the software detecting circuit and the hardware detecting circuit are provided to the logic AND circuit. In this manner, in a case where the status of the operating switch changes from opened to closed, the driver and control circuits for the power components will provide a signal to control the engine to operate when and only when both the hardware detecting circuit and the software detecting circuit determine that the provision of such a signal is correct, which can effectively avoid the danger existing along with the program running error or other abnormal situations. In addition, by connecting two or more power components in serial, the engine will not work by accident and the machine will not be out of control when any one of the power components is damaged. The power components can be a SCR, a power transistor, an Insulated Gate Bipolar Transistor (IGBT), a Metal Oxide Semiconductor Field Effect Transistor (MOSFET), a magnetic-controlled switch or a relay. Furthermore, if the electric instrument is an AC instrument and the power component is a SCR, a suitable capacitor can be used in the logic AND circuit to isolate the control pin of the SCR and other control circuits, and a high frequency pulse signal can be used as the control signal. In this way, when AC voltage with high voltage and low frequency is directly applied to the control pin of the SCR by abnormal reasons, the low frequency AC signal will not damage the entire control system due to the isolation and the attenuation of the capacitor; thus, the failure and permanent damage of the entire system are avoided. The high frequency control signal flows through the capacitor without attenuation (or with small attenuation) to control the normal on and off status of the SCR, and makes the machine operate normally.

BRIEF DESCRIPTION OF THE DRAWINGS

In the course of the detailed description that follows, reference will be made to the attached drawings in which.

DETAILED DESCRIPTION

Figure 1:
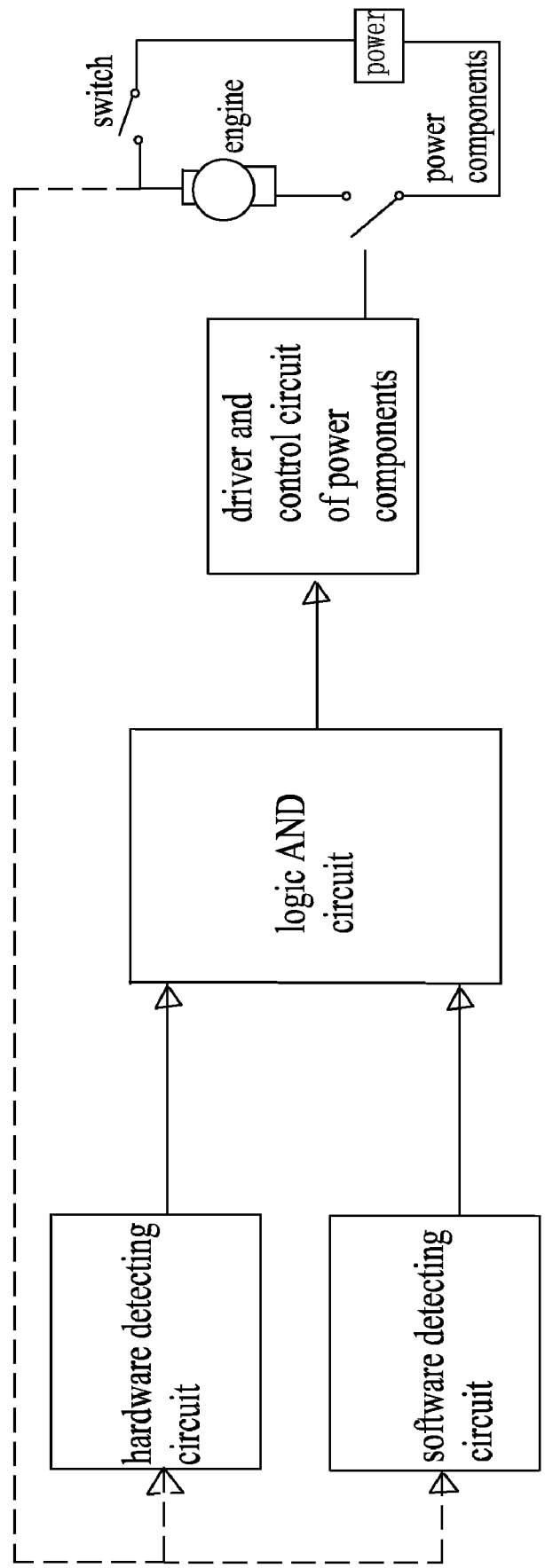
FIG. 1 is a block diagram showing exemplary components of a protection circuit suitable for electrical instruments constructed according to the present invention.

As shown in FIG. 1, a protection circuit suitable for electrical instruments comprises a hardware detecting circuit, a software detecting circuit, a logic AND circuit connected with the hardware detecting circuit and the software detecting circuit, a driver and control circuit for the power components that is connected with the logic AND circuit, and the power components.

When the protection circuit operates, the hardware detecting circuit detects whether the status of an operating switch associated with an operating engine or motor (equally referred to herein as "engine") of an electrical instrument is opened or closed. Meanwhile, the software detecting circuit detects whether the status of the operating switch is opened or closed. When both of the hardware detecting circuit and the software detecting circuit detect that the status of the operating switch is closed, the driver and control circuit for the power components will generate output signals to drive the power components on to thereby start the engine of the electrical instrument.

Figure 2:
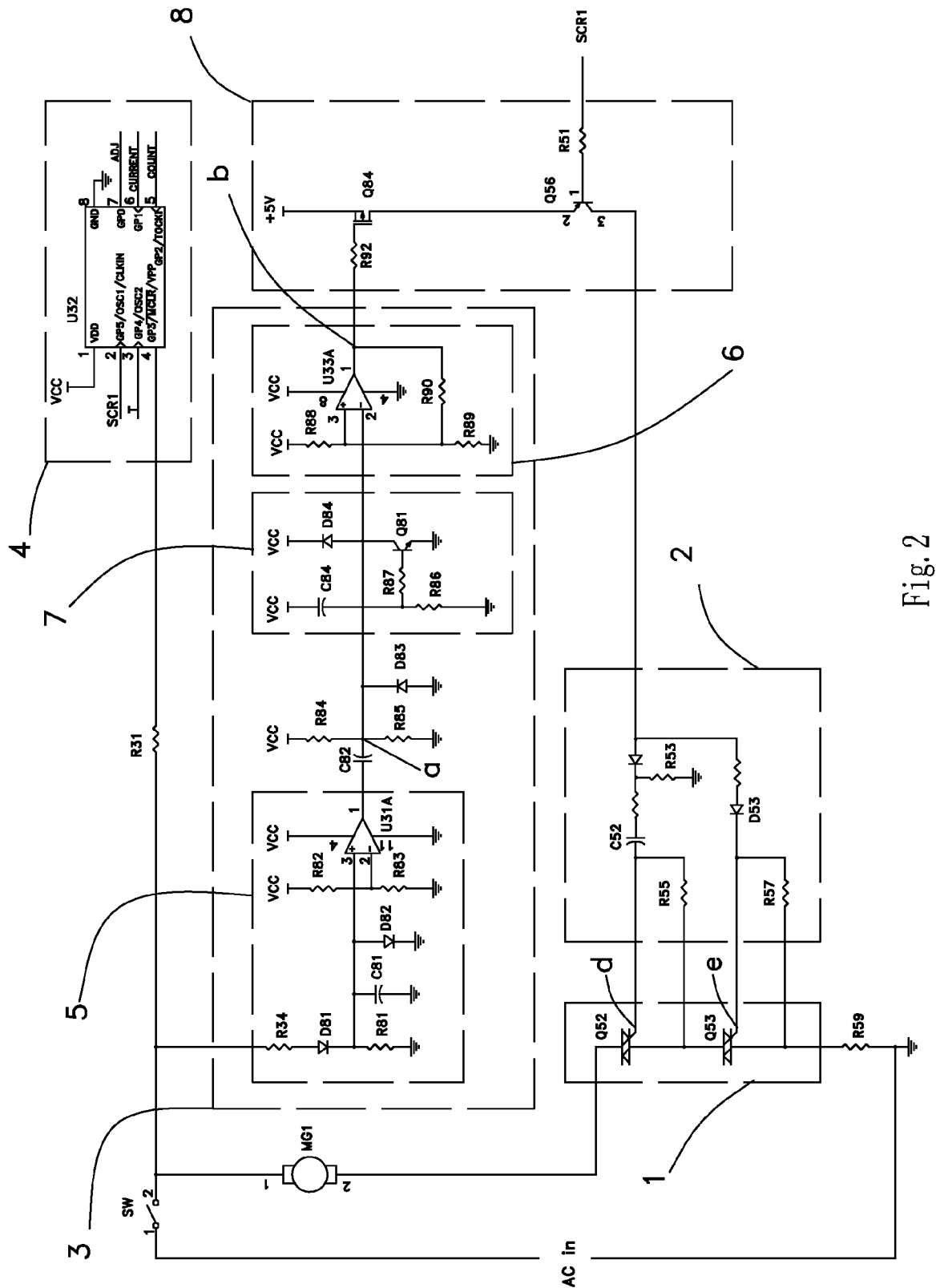
FIG. 2 is a circuit diagram of an exemplary AC electrical instrument.

FIG. 2 shows an exemplary protection circuit for an AC electrical instrument wherein the two power elements comprising the power components 1 are respectively two SCR elements Q52, Q53 in serial, which are controlled by the driver and control circuit 2 for the power components. When any one of the two SCR elements Q52, Q53 is shorted, the other SCR element can still work to control the operation of the engine effectively and avoid the engine getting into an out of control state and dangers caused thereby. Here, in different electrical instrument, the SCR elements could be replaced by a power transistor, an IGBT, a MOS transistor, a relay, magnetic-controlled switch, or other controllable elements through which high current can flow to enable the operation of the engine.

The driver and control circuit 2 for the power components comprises capacitor C52 and resistors, as illustrated. The capacitor C52 is connected to SCR Q52. If accidents happen such as Q52 is on first, AC voltage will be applied on the control gate d of Q52. Due to the isolation and attenuation of C52 and R53 to the low frequency AC power, the attenuated voltage can not damage Q56 and other elements. Thus, the protection is achieved. However, the high frequency control signal from the transistor will not be attenuated by the capacitor C52. Thus, C52 will not impact the normal function for controlling.

The hardware detecting circuit 3 comprises a rectifier and pulse-shaping circuit 5, a comparing circuit 6, a power-up preprocessing circuit 7, and several diodes, capacitors, and resistors as illustrated. The switch signal is input from R34.

In the rectifier and pulse-shaping circuit 5, when the start switch is closed, the AC electrical signal input from R34 is rectified by diode D81 and filtered by C18, and then is compared with the voltage on the pin 2 of the comparator U31A. The pin 1 of the comparator U31A will output a high level voltage. When the start switch is opened, no AC electrical signal is input from R34, the voltage on pin 3 of U31A is 0, and pin 1 of the comparator U31A will output a low level voltage.

In the power-up preprocessing circuit 7, when the system is powered up (connected to the power), VCC will charge C84 through R87 and R86, current flows through the base of Q81, and Q81 is on and point a of the hardware detecting circuit is forced to be connected to the ground. After a while, C84 is fully charged, no current flows through R87, and Q81 is off and the voltage at point a is not impacted by Q81. That is to say, when the system is powered up (connected to the power), no matter the status of the other circuits and signals, the power-up preprocessing circuit 7 will force point a to low level voltage. Then the power-up preprocessing circuit 7 will not work, and the voltage of point a will rise to the voltage set by R84 and R85. If no new action is taken by the start switch, the voltage at point a will keep constant.

Figure 3A:
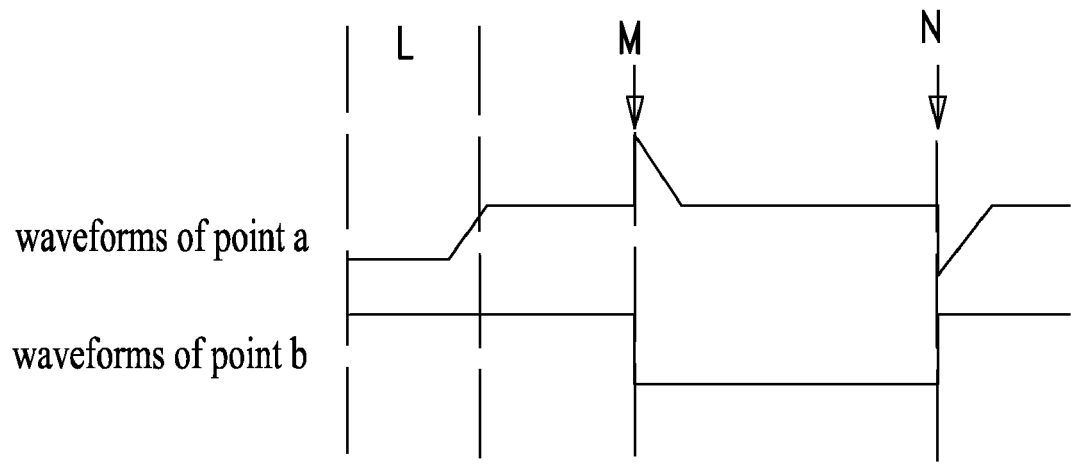
FIG. 3*a* and FIG. 3*b* are diagrams of waveforms in the points of the AC electrical instrument at given times.
Figure 3B:
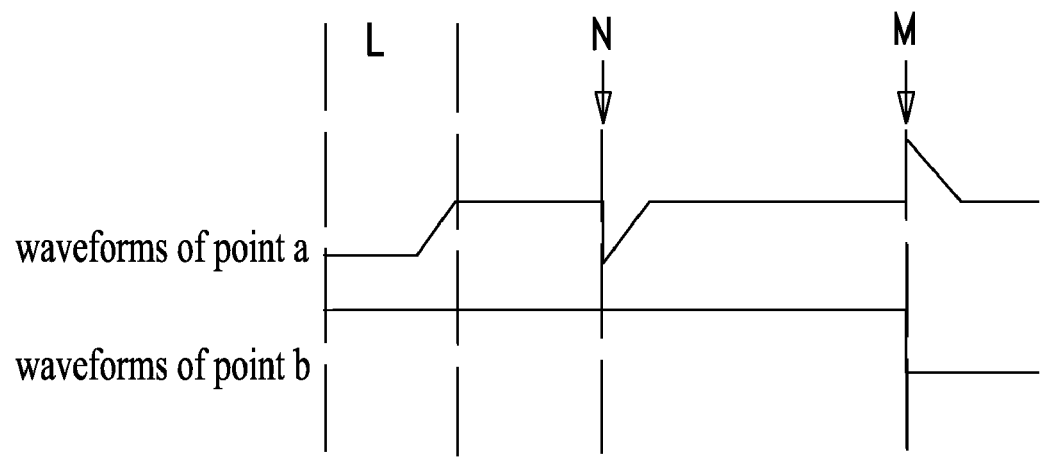

In the comparing circuit 6, U33A, R88, R89, R90 comprise a feedback comparator. The voltage at point a is compared with the voltage at pin 3 of U33A. The output signal of pin 1 of U33A, namely point b, varies with the signal at point a. The waveforms of point a and point b at different time slots are shown in FIG. 3a and FIG. 3b. Range L is the power-up period. Operation M is that of the start switch going from off to on after power-up. Operation N is that the start switch going from on to off after power-up. That is to say, only when the start switch is moved from off to on will the hardware detecting circuit 3 output low level voltage.

The software detecting circuit 4 comprises microcontroller U32 to detect the signal of the switch. Pin 4 is the signal input end, pin 2 is connected to the logic AND circuit 8. Only when the microcontroller U32 detects that the switch is moved from opened to closed will pin 2 output a high frequency pulse signal. In any other cases, the microcontroller always outputs a high level DC signal.

In the logic AND circuit 8, when the hardware detecting circuit fails to detect the transition that the switch from off to on, the logic AND circuit 8 will output a high level voltage, that is to say, the control gate is in high level voltage, Q84 is off, and no power is output. Q56 does not output an electrical signal, whatever the status of its base is. Meanwhile, when the software detecting circuit fails to detect the transition that the switch from off to on, pin 2 of the microcontroller will continue outputting a high level voltage, Q56 will be off, and no electrical signal will be output from Q56. That is to say, if any one of the detecting circuits fails to detect the transition of the switch from off to on, power component 1 will not receive a driver signal, SCR will be off, and the engine will not operate. Therefore, the logic AND function is carried out.

That is to say, only when both the hardware detecting circuit 3 and the software detecting circuit 4 detect the transition of the start switch from off to on, the engine starts to operate. Thus the protection of the power-up is achieved. When the switch transitions from on to off, the engine stops operating.

Figure 4:
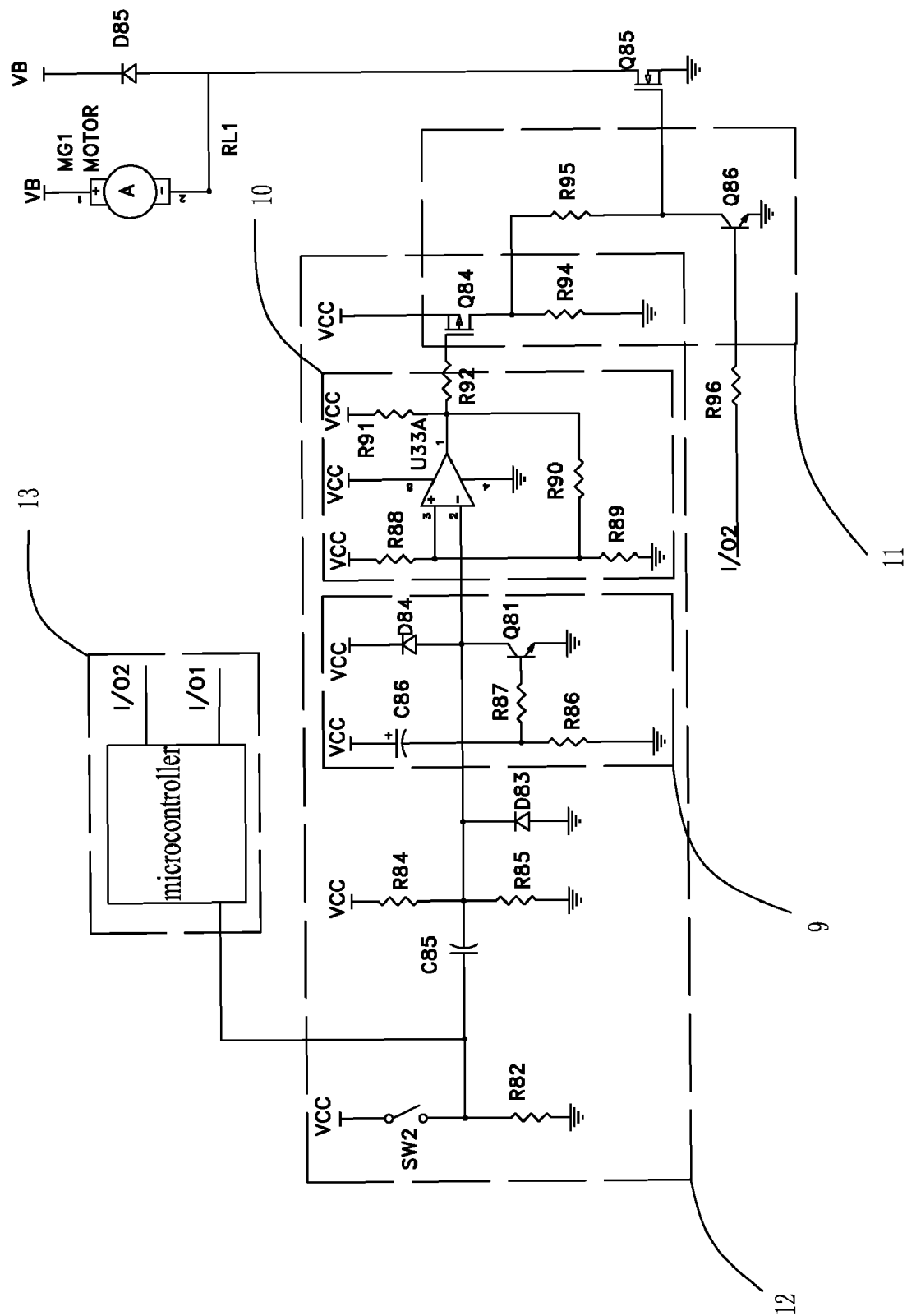
FIG. 4 is a circuit principle diagram of an exemplary DC electrical instrument.

FIG. 4 shows an exemplary protection circuit for a DC electrical instrument, and the principle is the same as that of the AC circuit above mentioned. The protection circuit for a DC electrical instrument comprises a power-up preprocessing circuit 9, a comparing circuit 10, and a logic AND circuit 11. Since the voltage is already at a high or low level voltage when the start switch is on or off, the rectifier and pulse-shaping circuit 5, diode D81 and other rectifying elements are not required in this circuit.

The relationship between the hardware detecting circuit 12 and the software detecting circuit 13 is logic AND. If any of the systems fails to detect the signal of the switch from opened to closed, the engine will not operate. It is ensured that the engine will not operate when powered up, if the switch is always close.

When the switch is transitioned from off to on, the transistor Q84 will be on and outputs a high level voltage. Meanwhile, the software detecting circuit 13 will detect that the status of the switch is transitioned from off to on and outputs a low level voltage, Q86 of the logic AND circuit 11 is off. The high level voltage output by Q84 is applied to the control gate of Q85, transistor Q85 is on, and the engine will work. When the switch transitions from on to off, the engine does not operate.

The power-up protection circuits for electrical instruments disclosed herein are not to be limited by the above descriptions or the structures shown in the drawings. Rather, obvious alternations, replacements, or modifications based on the descriptions and illustrations provided are contemplated and are meant to fall within the protective scope of the claims set forth below.

What is claimed is:

1. A protection circuit suitable for use with an electrical instrument having an engine, comprising:
   a software detecting circuit,
   a hardware detecting circuit;
   a logic AND circuit connected with the software detecting circuit and the hardware detecting circuit; and
   a driver and control circuit for power components connected with the logic AND circuit;
   wherein the power components control an operating state of the engine of the electrical instrument.

2. The protection circuit according to claim 1, wherein the hardware detecting circuit comprises a comparing circuit and a power-up preprocessing circuit, the power-up preprocessing circuit is coupled with a signal input end of the comparing circuit, and the comparing circuit is coupled with the logic AND circuit.

3. The protection circuit according to claim 1, wherein the electrical instrument comprises an AC electrical instrument and the power-up preprocessing circuit further comprises a rectifier and pulse-shaping circuit, the rectifier and pulse-shaping circuit being coupled with the signal input end of the power-up preprocessing circuit.

4. The protection circuit according to claim 1, wherein the driver and control circuit for power components comprises at lease one capacitor.

5. The protection circuit according to claim 1, wherein the power components comprise at least two power elements connected in serial.

6. The protection circuit according to claim 5, wherein the power element comprises one of a silicon controlled rectifier, a power transistor, an IGBT, a MOSFET, a relay, and a magnetic-controlled switch.

7. The protection circuit according to claim 1, wherein the logic AND circuit comprises a first switch transistor and a second switch transistor.

8. A protection circuit suitable for an electrical instrument having an engine, comprising:

a software detecting circuit;
a hardware detecting circuit; and
a logic AND circuit connected with the software detecting circuit and the hardware detecting circuit and coupled to operating circuitry for the engine;
wherein the engine of the electrical instrument can be operated only when the software detecting circuit and the hardware detecting circuit both detect for the logic AND circuit that the status of a start switch changes from off to on.

* * * * *